United States Patent
Goode et al.

(10) Patent No.: US 7,277,443 B2
(45) Date of Patent: Oct. 2, 2007

(54) ASYNCHRONOUS SERIAL INTERFACE (ASI) RING NETWORK FOR DIGITAL INFORMATION DISTRIBUTION

(75) Inventors: Christopher W. B. Goode, Menlo Park, CA (US); Yong Ho Son, Palo Alto, CA (US); Steven Zack, Burlington, NJ (US); Danny Chin, Princeton Junction, NJ (US)

(73) Assignee: Sedna Patent Services, LLC, Philadelphia, PA (US)

( * ) Notice: Subject to any disclaimer, the term of this patent is extended or adjusted under 35 U.S.C. 154(b) by 894 days.

(21) Appl. No.: 10/690,868

(22) Filed: Oct. 22, 2003

(65) Prior Publication Data

US 2004/0081084 A1 Apr. 29, 2004

Related U.S. Application Data

(63) Continuation of application No. 09/459,215, filed on Dec. 10, 1999, now Pat. No. 6,639,896.

(60) Provisional application No. 60/127,334, filed on Apr. 1, 1999.

(51) Int. Cl.
*H04L 12/56* (2006.01)
*H04L 5/14* (2006.01)
*H04L 12/437* (2006.01)

(52) U.S. Cl. .................. 370/400; 370/276; 370/223

(58) Field of Classification Search .............. 370/218, 370/223, 244, 276, 392, 400
See application file for complete search history.

(56) References Cited

U.S. PATENT DOCUMENTS

| 5,179,548 | A | 1/1993 | Sandesara | 370/16.1 |
|---|---|---|---|---|
| 5,218,604 | A | 6/1993 | Sosnosky | 370/85.14 |
| 5,327,427 | A | 7/1994 | Sandesara | 370/85.14 |
| 5,469,446 | A | 11/1995 | Fuhs et al. | 370/410 |
| 5,717,854 | A | 2/1998 | Egawa et al. | 709/219 |
| 5,862,138 | A | 1/1999 | Liu | 370/406 |
| 6,111,853 | A | 8/2000 | Goodman | 370/224 |
| 6,442,134 | B1 * | 8/2002 | Mitchell | 370/223 |

OTHER PUBLICATIONS

IBM Tech. Discl. Bull. vol. 37, Issue 4B (Apr. 1, 1994), pp. 241-244, "Shared Medium Based Subscriber Ring Access to ATM Networks".

* cited by examiner

*Primary Examiner*—Doris H. To
*Assistant Examiner*—Feben Micael Haile
(74) *Attorney, Agent, or Firm*—Patterson & Sheridan, LLP

(57) ABSTRACT

A digital information distribution system having a plurality of nodes that are connected to one another by counter-rotating data paths. Each node comprises a ring terminal that selects data packets from the data paths for use by the node and passes the remaining data packets to neighboring nodes. The data paths communicate data using asynchronous serial interface packets that transport video data or IP data.

8 Claims, 4 Drawing Sheets

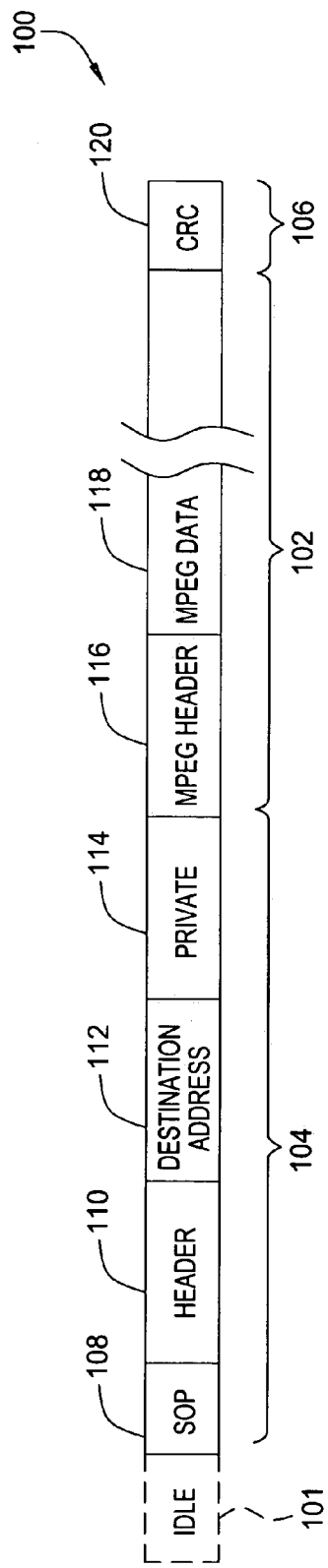
FIG. 1
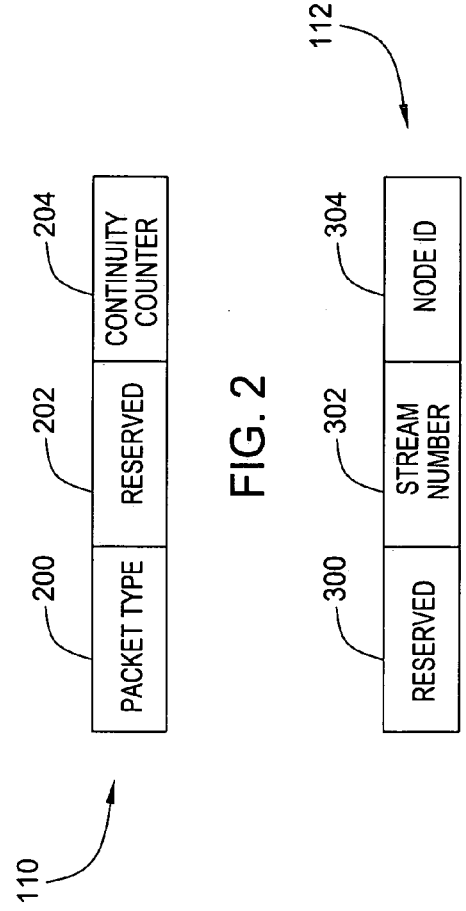
FIG. 2
FIG. 3

ASYNCHRONOUS SERIAL INTERFACE (ASI) RING NETWORK FOR DIGITAL INFORMATION DISTRIBUTION

CROSS-REFERENCE TO RELATED APPLICATIONS

This application is a continuation of U.S. patent application Ser. No. 09/459,215, filed on Dec. 10, 1999 now U.S. Pat. No. 6,639,896, which application claims the benefit of U.S. Provisional Application No. 60/127,334, filed on Apr. 1, 1999, and contains subject matter that is related to commonly assigned U.S. application Ser. No. 09/458,339, filed on Dec. 10, 1999. All such prior applications are incorporated herein by reference.

BACKGROUND OF THE DISCLOSURE

1. Field of the Invention

The invention relates to digital information distribution systems and, more particularly, the invention relates to an asynchronous serial interface (ASI) ring network for routing digital information to multiple users.

2. Description of the Background Art

Digital video can be distributed through networks that utilize asynchronous transfer mode (ATM) and packet over SONET. However, both of these types of digital video distribution systems are not cost effective and require significant overhead bandwidth for each respective packet format plus configuration and control overhead to facilitate network routing. A more efficient network solution for point-to-point transmission and delivery of Moving Pictures Experts Group (MPEG) packets is known as DVB-ASI (Digital Video Broadcast/Asynchronous Serial Interface). DVB-ASI is described in European Standard EN 50083 entitled "Cable Distribution System for Television, Sound, and Interactive Multimedia Signals", March 1997. This specification defines a protocol for distributing digital video in the form of MPEG packets at a rate of 270 Mbps. The actual data carriage under this protocol is 216 Mbps. Although the DVB-ASI protocol is well suited for simplex, point-to-point communications, a system based on this protocol is not capable of supporting high speed data transmissions that are necessary for multi-user digital video distribution systems. Furthermore, because of the limited data carrying capability, the DVB-ASI protocol does not efficiently utilize the bandwidth that is available for optical fiber based systems, i.e., a bandwidth that exceed 1 Gbps.

Therefore, there is a need in the art for a multi-user, digital video distribution system that provides high speed transmissions, e.g., more than a gigabit per second, in conjunction with a low overhead transmission protocol.

SUMMARY OF THE INVENTION

The disadvantages associated with the prior art are overcome by a packet structure that facilitates a multiple source, multiple sink, digital information distribution system having an asynchronous serial interface (ASI) ring network topology. The system is capable of delivering multimedia data (video and audio information) as well as internet protocol (IP) data using packets that comply with the Moving Picture Expert Group (MPEG) packet standard. The MPEG packets form the payload within a unique packet structure. The packet structure enables efficient routing of the packets through an ASI ring network. Specifically, the packet structure comprises a packet header, a routing information field, a private data field, digital video payload, and an error correction code field. Such a packet structure enables the network to deliver digital information through the ASI ring network to a user that is identified in the routing information field.

The packet structure is routed through a ring network comprising a plurality of nodes that are interconnected via counter-rotating communications paths. Within each network node is a ring terminal that facilitates routing of packets through the network. The ring terminal extracts packets from the communications paths that are addressed to a particular node and injects packets into the paths that are to be communicated to other nodes. The ring terminals also handle network faults by re-routing packets to avoid communications paths and/or network nodes that fail.

BRIEF DESCRIPTION OF THE DRAWINGS

The teachings of the present invention can be readily understood by considering the following detailed description in conjunction with the accompanying drawings, in which:

FIG. 1 depicts a packet structure of the present invention;

FIG. 2 depicts the packet header field of the packet structure of FIG. 1;

FIG. 3 depicts the destination address field of the packet structure of FIG. 1.

To facilitate understanding, identical reference numerals have been used, where possible to designate identical elements that are common to the figures.

DETAILED DESCRIPTION

Figure 4:
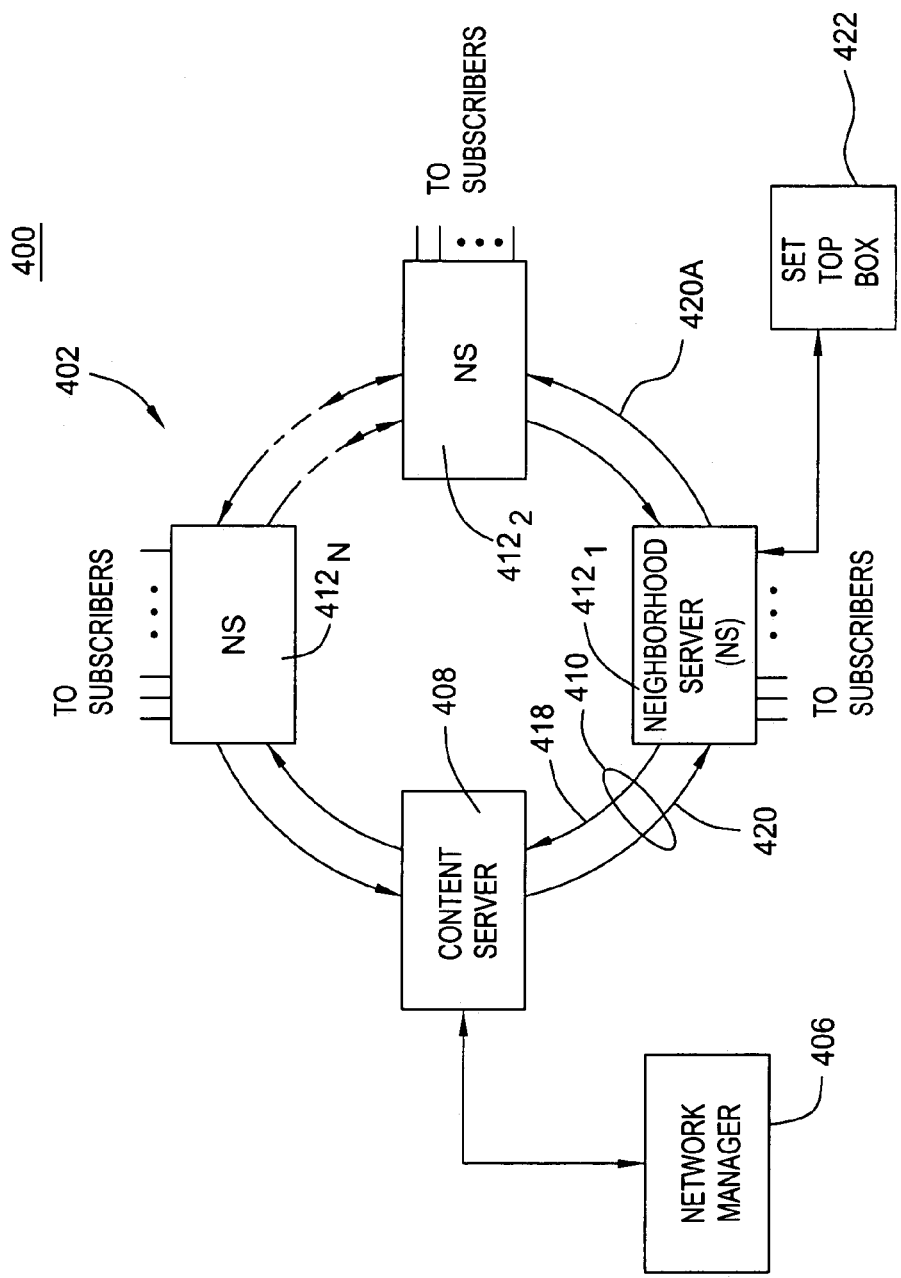
FIG. 4 depicts an ASI ring network capable of routing digital video information to users using the packet structure of FIG. 1.
Figure 5:
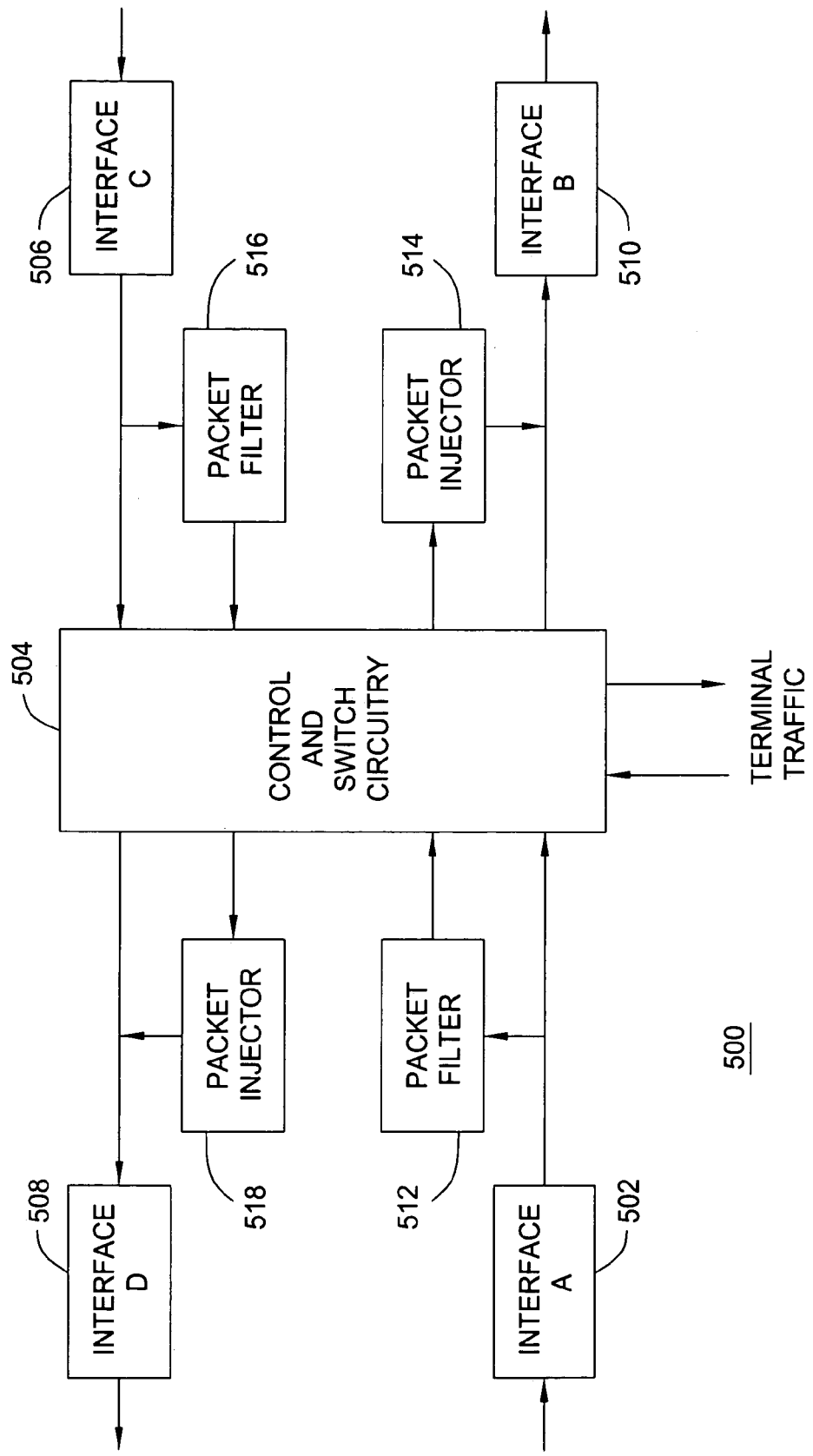
FIG. 5 depicts a block diagram of a ring terminal for the ASI ring network of FIG. 3.
Figure 6:
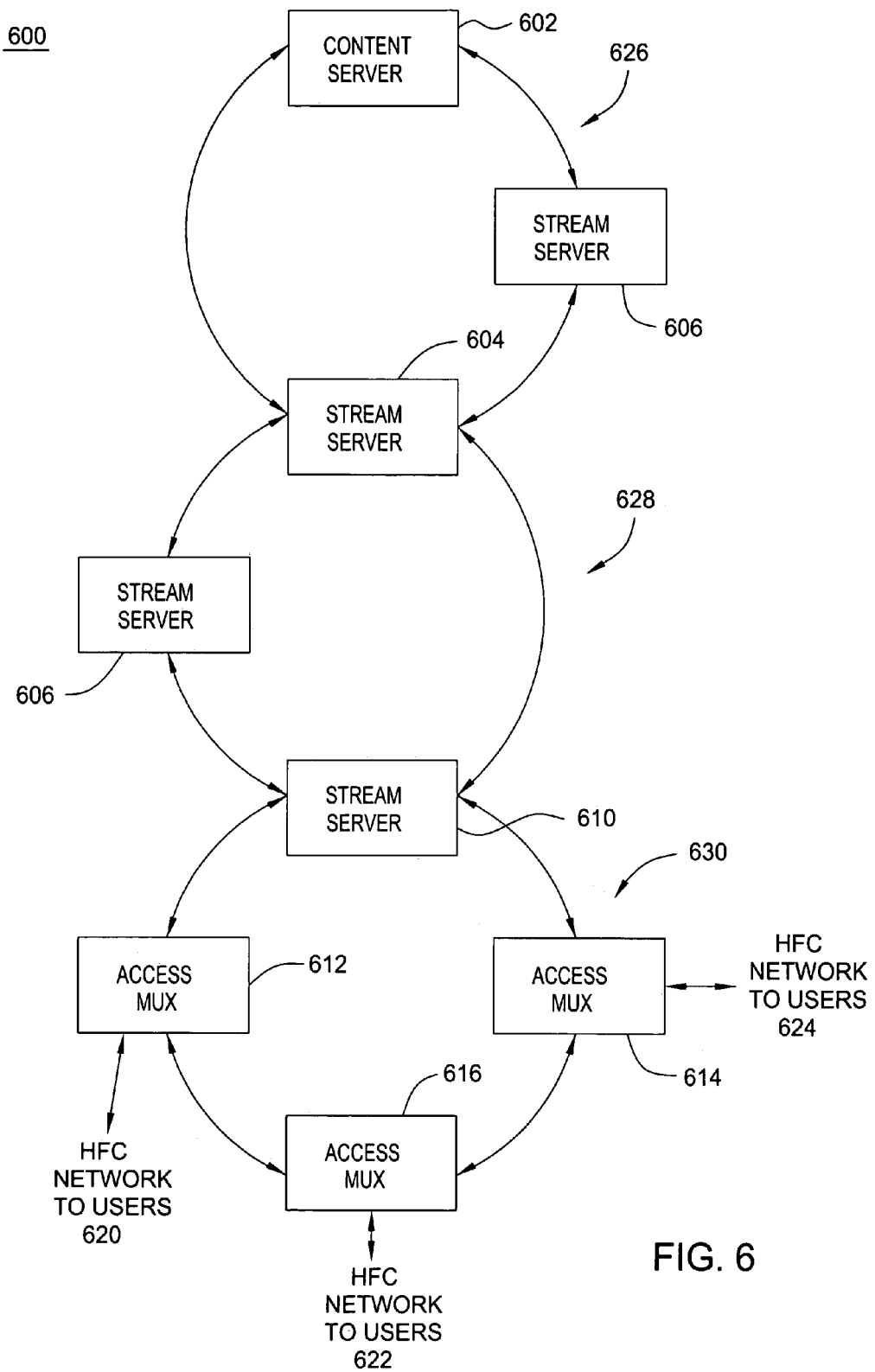
FIG. 6 depicts a block diagram of a specific application of the ASI ring network for distribution of digital video and IP data to users.

The present invention provides a network for video data transmission having a high transmission bit rate and a network topology that supports multiple source and multiple sink video data distribution. The present invention comprises a packet structure 100 as shown in FIGS. 1, 2 and 3 and a multi-user video data distribution network as shown in FIGS. 4-6.

This packet structure facilitates high bandwidth data streaming of constant bit rate (CBR), variable bit rate (VBR) and undefined bit rate (UBR) data. CBR data is typically used for audio and video, VBR data can be used for video to take advantage of the compression of movies such that certain scenes are compressed more or less than other scenes, and UBR data is used for internet protocol (IP) data. For each of these data types, the packet structure can be used to implement quality of service such that the network can simultaneously handle various types of services and adapt the services in response to network congestion. For example, if the network is congested to a point where CBR can not be guaranteed to each user, the packet structure can be used to send data in a UBR manner and video in a CBR manner. As such, using a quality of service technique, certain services can be guaranteed a particular bandwidth for a particular connection.

The packet structure is typically transmitted through a network in a serial format, then the packet is converted into a parallel format upon being received at a network node. The two formats have identical fields; however, in the parallel format an IDLE character field 101 is removed from the serial packet format.

The packet structure 100 of both the serial and parallel formatted packets comprises a payload portion 102, a header portion 104 and a trailer portion 106. The payload portion 102 is 188 bytes in length to accommodate an MPEG-2 transport packet. Within the 188 bytes are 4 bytes of header information 116 and 184 bytes of MPEG data 118. There are 12 bytes of information in the header portion 104 and 4 bytes that are placed as an extended trailer portion 120. To handle errors in transmission the trailer portion 120 comprises a 4 byte cyclical redundant code (CRC) field. The CRC value is used for error detection and correction.

An IDLE or comma character (defined as the K28.5 character according to the 8B/10B encoding specification) appears in the IDLE field 101 in front of every packet. The field is only present in the serial packet format. These comma characters are used by the network nodes to obtain the frame boundary locations of the packets. A minimum of two comma characters is required by the DVB-ASI specification. At least four comma characters are transmitted between each packet initially because hardware requires four consecutive comma characters to obtain initial synchronization. In the event that synchronization is lost (due to a cable being temporarily disconnected for example), the use of four comma characters allows resynchronization to occur within one packet time. More efficient use of bandwidth can occur by inserting comma codes less frequently than before each packet. The cost of less frequent comma codes is that, upon synchronization loss, the network will require more MPEP packets to be lost (not routed properly) while the network nodes await enough comma codes to resynchronize.

The header portion 104 comprises a 1 byte sync field 108, a 3 byte packet header 110, a 4 byte destination address field 112, and a 4 byte private data field 114. The sync field 108 is one byte in length and has a value that facilitates packet synchronization.

The packet header 110 provides synchronization information that is used by routing switches in the network nodes to route the packet and by a depacketizer at a user's location to extract the payload information from the packet 100. The packet header field 110 is composed of three bytes as shown in FIG. 2. The header 110 provides information 200 to identify the type of packet which will be used to determine how the bytes in the packet should be interpreted. There are eight undefined bits in the reserved sub-field 202 that can be used for future enhancements since this sub-field is not used at the current time. The continuity counter sub-field 204 is similar in function to the continuity counter field defined in the MPEG-2 specification in that sequential packets within a stream (comprising audio, video and program specific information data) have this value incremented by one.

The packet type sub-field 200 is used to distinguish between different types of payload contained with the packet 100. The types of packets include data packets carrying real-time MPEG data, data packets carrying MPEG data using flow control, IP packets, in-band message packets, and reserved values.

The data packets for real-time MPEG data contain MPEG data for real-time streams. No flow control or throttling of the data is defined in this protocol for real-time MPEG streams, thus any errors in transmission will result in a packet being dropped at the user equipment. This is deemed necessary for streaming video and audio. The packet type field equals 16(0×10).

The data packets carrying MPEG data with flow control contain MPEG data being routed through the network using some type of flow control performed by software at a higher level. This is performed for content introduction or content migration (i.e., movement of video content from one video server to another). In these situations it is very important to be able to recognize if a packet(s) has been dropped somewhere in the network. Since this data is being written to disk, e.g., for many iterations of subsequent playing of this locally stored movie, the network must be able to guarantee that all the data actually arrived at the destination.

Internet protocol (IP) data that is formatted into the payload portion 102 is identified because some nodes might process these packets differently. For instance, a routing switch has the ability to transfer IP packets through the in-band port when bandwidth is available on the port, i.e., no data packets are being transferred. In one embodiment of the invention, the IP packet is contained within the 184 byte data field 118 of the MPEG data packet while an MPEG header 116 remains before the data. This form of payload, an MPEG header plus IP data is referred to as IP over MPEG. In alternative embodiment of the invention, the entire payload portion 104 carries IP data, i.e., 188 bytes of IP data. Within the routing switch the switch controller processor will be responsible for formatting a single IP packet into multiple payload portions 102. For IP packet transmission, the IP packets are encapsulated using LLC/SNAP encapsulation and the encapsulated packets are than segmented into payload portion sized packets for insertion into the payload portion 118 of the MPEG packet 102. The packet type field will equal 18 (0×12).

Special messages that require low latency between nodes are sent through an in-band connection. Examples are user migration messages, timestamp synchronization messages, "ping" messages, etc. These are used when a message does not need to incur the overhead or processing power required for IP messages. The packet type field is in the range between 128 (0×80) and 191 (0×BF).

Packets with a packet type sub-field between 0 and 15 and from 192 to 254 are reserved for future use.

The private data field 114 (a reserved vendor specific field) contains application specific data that facilitates payload handling. For example, in a video distribution system, the private data identifies the title identification codes (TIC) that are associated with specific programs being transported in the payload portion 104. The title identification code (TIC) field 114 is used to perform stream integrity checking on a packet-by-packet basis for data packets only. At some nodes within the system, when a data packet is received, the received TIC is compared to the expected TIC to verify that the correct content is being received. The expected TIC is stored in a lookup table that is indexed by the destination address from the received packet. When the TIC stored in the table matches the received TIC, then the packet has been received correctly, otherwise, an error has occurred and the packet needs to be removed from the stream. For non-data packets such as IP packets or in-band messages, this field will be reserved for future use. A possible use would be to store the source address of the packet.

FIG. 3 depicts the destination address field 112. The destination address field 112 is used to route the packet 100 to the proper destination node. This field is also used by the destination endpoint node to identify the packet so that it can be processed correctly. Every destination node in the network must have a unique address and the stream going to that particular address must be uniquely identified. The field 112 is 32 bits long and comprises a 4 bit reserved sub-field 300, a 12 bit stream number sub-field 302 and a 16 bit node ID sub-field 304. The reserved sub-field is preserved for future use.

The node ID sub-field 302 is a 16-bit identifier that provides a unique address for every node in the system. This allows for a maximum of 65,536 different nodes to exist within a network. A packet's node ID will be examined by a node in the network to determine if the received packet is intended to be processed by that node. If the node ID field in the packet does not match the board's own node ID contained in memory then the packet needs to be routed to another node. When this is the case, the received node ID accesses a lookup table that provides the routing information and any other associated data for that packet.

When the received node ID field does match the board's own node ID, then the packet is intended to be removed from the network and processed by that node. The stream number sub-field which is described below is then used to index a table to provide information specific to that particular stream.

The node ID for a particular node in the network is assigned when the node initially logs onto the system. When a device-is first powered up, it must make its presence known to the network so that the device can receive a node ID. Once it receives its node ID, the device can then communicate with other devices on the network.

The stream number subfield 302 is a 12-bit identifier that is assigned by the destination node to uniquely identify a data stream being sent to that node. This allows for a maximum of 4096 streams to be processed by any individual node. This field is used in conjunction with the node ID to uniquely identify a packet in the network.

When using the packet structure 100 in a switched network, such as an ATM-like network, the destination address field 112 carries information that is used to define a virtual path identifier and/or a virtual channel identifier. As such, the destination address field information facilitates routing of the packet through a plurality of switches that form the network.

The MPEG data field 118 contains the encoded MPEG-2 transport stream that is being delivered to the destination node. For non-data packets such as IP packets, the IP packets are encapsulated and divided into multiple payload portions 102.

For IP packet transmission, the IP packets are encapsulated using LLC/SNAP encapsulation and the encapsulated packets are than segmented into payload portion sized packets for insertion into the payload portion 102 of the packet 100. These reformatted IP packets are inserted at the origination switch in place of null packets. The destination field information used for these packets is used to route the IP data through the network. At the destination end, the last switch extracts the data carrying packets and reassembles them back to IP packets. A virtual LAN concept is supported by IP packets that are routed through the network in this manner.

In one embodiment of the inventive packet structure, the CRC-32 field 120 protects against bit errors being introduced within the network. A standard 32-bit Ethernet polynomial is used. The CRC is computed on all 200 bytes of the packet preceding the CRC. In alternative embodiments of the inventive packet structure, the trailing 4 byte field 120 forms a vendor specific field that may contain information used to support particular vendor equipment.

FIG. 4 depicts an ASI ring network 400 that carries digital video and IP data to various users (subscribers) from a network manager 406 using the above-described packet structure. The network manager 406 provides a source of digital video and IP data that is coupled to a central content server 408. The content server 408 is coupled to a number of distributed neighborhood servers $412_1$, $412_2$ ... $412n$ through a ring network 402. Each of the servers $412_1$, $412_2$ ... $412n$ form a node in the network and the nodes are connected to one another through computer-rotating communications paths or links 410. Each node has four network functions:

1) accepting traffic from the link directed to its address;
2) injecting traffic on the link that the node wants delivered to another node;
3) detecting failures on transmission links; and
4) reporting link failures and reconfiguring the node to ensure that the overall traffic is not interrupted.

A ring terminal that facilitates these network functions is discussed in detail with respect to FIG. 5.

To accomplish these network functions, the communications links that form the rings 410 are counter-rotating such that data on ring 418 flows in the clockwise direction, while data on ring 420 flows in a counter-clockwise direction. The data is routed through the servers 408, 412 based upon the destination address in each data packet. The content server 408 addresses the data to each of the distributed servers 412 such that the content server 408 can propagate digital video to the distributed servers 412 in each of the neighborhoods. The distributed server receiving the data can save or store the information and/or distribute it directly to the subscriber equipment, e.g., a set top box 422 for decoding and display to a user. The counter-rotating ring network 402 operates such that if the link 420A to the distributed server $412_2$ should fail, then distributed server $412_1$ will route the information that would have been passed on the ring 420A to distributed server $412_2$ back through its internal ring terminal and return the packet to server 408 for routing through servers $412_n$ to the server $412_2$. While handling a transmission fault, the dual, counter-rotating ring 402 becomes a single ring.

In a dual, counter-rotating ring network architecture, each node determines which ring has lighter traffic and sends a packet on the ring with the lighter traffic. As such, the system allows the user of both directions of the counter-rotating ring to deliver bandwidth to the customers, thus effectively doubling the capacity to deliver content.

The low overhead MPEG-based transport packets enable a very high data rate to be transmitted through such a dual, counter-rotating ring network 402. The data rates for such a system are greater than 1 gigabits per second.

FIG. 5 depicts a ring terminal 500 that resides in each node and is used to route packet traffic through the ring network topology. The ring terminal 500 comprises four interfaces 502, 506, 508, and 510 that couple to the transmission links between nodes, two packet filters 512, 516 for extracting packets carried by the transmission links, two packet injectors 514 and 518 form injecting packets to be carried by the transmission links and control and switch circuitry 504 for routing packets correctly through the node. Packet traffic enters the terminal 500 at interface A 502. Interfaces A 502 and B 510 form a physical connection to the transmission link between nodes, e.g., a ring with traffic flowing through the node from left to right. Each interface 502 and 510 contains circuitry that is specific to the transmission medium used for the link, e.g., optical fiber would require a fiber channel interface.

Packet filter 512 extracts the packets that are destined for this terminal 500. The packet filter 512 identifies the destination by matching the destination address information to the terminal's address. Any packets having a matching address are coupled from the filter to the control and switch circuitry 504. When a packet is extracted, the filter 512 inserts a null packet generally in the place of the extracted packet. The remaining packet stream is routed through the circuitry 504 to the packet injector 514.

At packet injector 514, the terminal 500 injects packets that are destined for another node into the packet stream. Such injection is generally accomplished by replacing null packets with payload packets. The traffic is then coupled through interface B 510 to the transmission link that propagates the traffic to the next node (ring terminal).

The traffic handling is performed for traffic propagating in the other direction (e.g., right to left through the node 500) by interface C 506, packet filter 516, packet injector 518 and interface D 508. As such, the ring terminal 500 handles traffic flowing in two, counter-rotating directions.

The control and switching circuitry 504 has ten ports for routing the packets through the terminal as well as accepting packets (terminal traffic) to be inserted into the streams and extracted from the streams. The functions of this circuitry include:

1) monitoring the received traffic for link failures;
2) rerouting traffic upon detection of a failure; and
3) extracting payload data from packets and routing the data to the node circuitry, e.g., a remultiplexer for MPEG traffic or a IP data reformatter.

Upon fault detection in, for example, the link coupled to interfaces B 510, the switch circuitry 504 reroutes traffic from interface A 502 through the switch circuitry 504 to interface D 508. Thus, the failed link is avoided. As soon as the failure is detected, the interface D 508 is configured to send a special code through the network to signal the next terminal in line that a failure has occurred. Additionally, a control packet is formatted and sent over the network to inform the other terminals of the change in network configuration, e.g., data is being routed from port A to port D rather than port A to port B. The terminal monitors the failed link to identify when the link has recovered. Upon recovery, interface D 508 sends another special code as well as a control packet to inform the terminals in the network of the changed network configuration.

FIG. 6 depicts a network 600 having a plurality of interconnected rings 626, 628, 630 for distributing digital video and IP data to users. In this figure, the signal paths having an arrow at each end indicate a bi-directional signal path supporting dual counter-rotating rings. Thus, each path comprises a pair of oppositely directed transmission links.

The first ring 626 comprises a content server 602 and a plurality of stream servers 604 and 606. The content server 602 is a source of streaming digital video that is distributed to the various stream servers where the streams are stored for future delivery to users. In this ring 626, bandwidth between the content server and the stream servers is high, while the bandwidth used for communications between the stream servers and the content server is small. The stream server to content server communication is limited to IP messaging to request specific video content or files and an occasional file transfer for backup and recovery purposes.

The second ring 628 comprises peer-to-peer communications amongst stream servers 604, 608 and 610. The transmissions in this ring 628 are generally a transfer of video assets to move video streams from one server to another to accommodate user loading or user requests for an asset that is not presently stored in a particular server.

The final ring 630 connects a particular server, for example, server 610, to a plurality of access multiplexers 612, 614 and 616. The traffic is substantially distributive in that the servers are sourcing high bandwidth video streams to the multiplexers for delivery through a hybrid fiber cable (HFC) network to the users, i.e., multiplexer 612 delivers to network 620, multiplexer 614 delivers to network 624 and multiplexer 616 delivers to network 622. Reverse traffic is limited to low bandwidth signals that facilitate command and control of the streams.

Each ring 626, 628 and 630 is configured by a designated "head-of-ring" node that is responsible for establishing the membership in the ring and re-establishing the ring after a failure. The ring establishing protocol operates as follows:

1) each ring node that is not "signed-on" periodically sends a control packet requesting sign-on;
2) the head-of-ring node receives the control packets and replies with a broadcast control packet providing the routine identifier for the requesting nodes;
3) a well-known identifier, such as the Ethernet MAC address of the control processor in the nodes, is used in the data field to identify nodes prior to sign-on;
4) the ring may auto-discover its topology by having intermediate nodes append node identity information to sign-on requests such that the head-of-ring node automatically discovers the ring topology; however, in most instances, the ring topology is provisioned to the head-of-ring node by a network manager.

The routing fields use the following standard definitions to facilitate certain network functions:

1) zero indicates a null packet;
2) FFFFFF indicates a broadcast packet;
3) other routing tags have two fields
   Field 1 is an 8-bit node number;
   Field 2 is a circuit identifier within the node.

A distributive ring topology that is used for distributing a high bandwidth signal, while return traffic has low bandwidth, is the most typical topology used for video distribution. In this topology, the head-of-ring node is the source of all video traffic. Such a topology has the following attributes:

1) Unidirectional Traffic Routing—under normal traffic patterns, all traffic travels in one direction (the downstream path). The reverse direction is reserved for IP return traffic.
2) Empty Packet Generation—the head-of-ring node generates a stream of empty packets to define the packet structure on the link for the upstream direction and ends all traffic received on this link.
3) Ring Failure—when a ring failure is detected, the head-of-ring node sends identical traffic in both send directions (both directions are now downstream). The nodes, at which failure occurred, terminate downstream traffic and generate a stream of null packets in the up stream direction.
4) Control Flow—the signaling of failures is only required to the head-of-ring node that maintains the current ring state.
5) Failure Model—the failure of the head-of-ring node causes a total ring failure, any other ring nodes may fail with the ring retaining full to partial traffic capacity.

If the furthest node from head-of-ring fails, the ring can retain full capacity by partitioning the topology into two single path rings. If one of the other intermediate nodes fail, then less than full capacity, but greater than or equal to half capacity can be supported.

An internetworking ring that is used in peer-to-peer traffic handling has the following attributes:
1) Redundant head-of-ring node—at least two head-of-ring nodes are used, where one head-of-ring node is active and the other is on stand-by;
2) Traffic Model—the ring must support point-to-point, multicast and broadcast traffic. Point-to-point traffic is injected by the source and removed by the termination, while the source injects broadcast traffic and deletes the packets once they have completed a loop of the ring.
3) Routing—each node must have a ring model and determine the appropriate launch direction based on the shortest distance to the destination and available bandwidth on that link. This requires a bandwidth reservation protocol to ensure that the requisite bandwidth is available over the full link.
4) Failure Capacity—if a node fails, the ring loses up to fifty percent of its capacity and the nodes must recalculate packet routing to accommodate the failure. Note: Ring bandwidth usage and routing can be calculated by the active head-of-ring. Thus complexity is reduced on all other node.

The MPEG data field of the ring command packets contain parametric data that provides command and control functionality. The MPEG headers for these packets contain fixed PIDs such that these packets may flow over any hardware capable of routing MPEG packets. The data field includes a command type and parameter field. The commands include:
1) Ring Sign-on—a broadcast packet containing the node physical identity and a ring topology field;
2) Ring Sign-on Response—a pointcast packet assigning a node identity;
3) Ring Failure Notification—a pointcast packet indicating the node at which a failure was detected; and
4) Ring Topology—broadcast packet containing the current ring topology.

The MPEG payload portions can be used for transporting IP data. The frame and MPEG packet parts of the packet format provide a carriage for IP packets. In a network, be it ring, star, or other topologies, this data traffic can be routed or switched. In a routed network, the network uses the Destination Address 112 in the frame header 104, or the IP packet destination address to facilitate packet routing. The former is used rather than latter because the latter is undesirable because of the need to reassemble the LCC/SNAP block before decisions of routing based on IP address can be made. This is costly in hardware and in complexity. Hence, using the Destination Address 112 means that the Node ID 304 is unique and a special stream number 302 must be assigned for data traffic in order to distinguish a packet carrying IP data from a packet carrying video and audio MPEG data, i.e., stream number of 1 for data to each node. At the link layer, the Destination Address 112 of each packet defines a point-to-point link between any sender node to any destination node. At the sender node, a table of IP Address to Node Destination Address 112 must be kept and updated. There is a plurality of IP Address Destinations per ring node, e.g., IP packet from content server 602 to any IP address on the other side of the Access MUX 616, which uses Ethernet, are associated with the Node Destination Address of Access MUX 616. Destination Address 112 is unique within this protocol and is stripped off when data packets must traverse a different network, e.g. ATM, Ethernet.

Each destination node that receives a data stream number (in this example, number 1) performs a LLC/SNAP reassembly of the IP packet from N MPEG packets. Then the node routes the encapsulated IP Packet to its final destination, one destination possibility is the node itself. The determination of which IP addresses are accessible through specific ring node Destination Addresses is resolved by supporting ARP (Address Resolution Protocol) on a ring broadcast Destination Address that all ring nodes must parse.

In a switched network, VPI/VCI circuits are set up as VBR circuits on the ring between every two ring nodes which must act as a carriage for IP packets. Similar to routed networks, an IP address to VPI/VCI circuit table must exist at the sender node for all reachable IP addresses. The destination ring node reassembles the LLC/SNAP encapsulated IP packet and routes the packet to its final destination. Creation of this look up table can be supported by ARP. Analogous to ATM networks, multicast-and broadcast circuits can be set up and used in this option. For IP over MPEG, a ring node can be implemented as a bridge or a router. This disclosure defines both but notes details on a router. A bridge device passes Ethernet MAC addresses between every ring node and their immediate Ethernet bridge domain. Then the Destination MAC address is used in the look up table rather than IP address. The ring nodes provide a translational bridge function that bridges two or more Ethernet bridge domains across this ring. The benefits of this option do not outweigh the additional complexities in implementation, however.

Although various embodiments which incorporate the teachings of the present invention have been shown and described in detail herein, those skilled in the art can readily devise many other varied embodiments that still incorporate these teachings.

What is claimed is:

1. In a network for distributing packetized information, said network including a plurality of nodes coupled to one another through a pair of communication paths having the form of rings, where data traffic on a first ring flows in an opposite direction to data traffic on a second ring, wherein each of said nodes comprises a ring terminal, a method of routing packet traffic at a first node of said plurality of nodes, comprising:
receiving over said first ring, a first data packet stream at a first transmission link interface of said ring terminal associated with said first node;
extracting, at a first filter coupled to said first transmission link interface, packets destined for said first node;
inserting, at said first filter, null packets as replacement packets of said extracted packets;
forwarding said extracted packets to control and switching circuitry coupled to said first filter;
injecting, at a first packet injector coupled to said control and switching circuitry, packets associated with a second node to form a second data packet stream;
sending, to a second transmission link interface associated with said first ring, said second data packet stream;
receiving over said second ring, a third data packet stream at a third transmission link interface of said ring terminal associated with said first node;
extracting, at a second filter coupled to said third transmission link interface, packets destined for said first node;
inserting, at said second filter, null packets as replacement packets of said extracted packets;
forwarding said extracted packets to control and switching circuitry coupled to said second filter;

injecting, at a second packet injector coupled to said control and switching circuitry, packets associated with a third node to form a fourth data packet stream;

sending, to a fourth transmission link interface associated with said second ring, said fourth data packet stream.

2. The method of claim 1, wherein said packet injectors replace said inserted null packets with packets associated with a different node.

3. The method of claim 1, further comprising forwarding said second and fourth data streams over said first and second rings respectively from said second and fourth transmission link interfaces.

4. The method of claim 1, further comprising:

detecting, at said control and switching circuitry, transmission link failures; and rerouting traffic upon detection of a failure.

5. The method of claim 4, wherein in an instance of a failure occurring at said second transmission link interface associated with said first ring, said first data stream is routed to said fourth transmission link interface associated with said second ring.

6. The method of claim 5, wherein said second packet injector injects packets associated with said second node to form said second data packet stream.

7. The method of claim 4, wherein in an instance of a failure occurring at said fourth transmission link interface associated with said second ring, said third data stream is routed to said second transmission link interface associated with said first ring.

8. The method of claim 7, wherein said first packet injector injects packets associated with said third node to form said fourth data packet stream.

* * * * *